United States Patent
Berger

(10) Patent No.: US 8,161,375 B2
(45) Date of Patent: *Apr. 17, 2012

(54) SYSTEM AND METHOD FOR DESIGNING AND GENERATING ONLINE STATIONERY

(75) Inventor: Kelly Berger, Milpitas, CA (US)

(73) Assignee: Shutterfly, Inc., Redwood City, CA (US)

( * ) Notice: Subject to any disclaimer, the term of this patent is extended or adjusted under 35 U.S.C. 154(b) by 540 days.

This patent is subject to a terminal disclaimer.

(21) Appl. No.: 12/188,721

(22) Filed: Aug. 8, 2008

(65) Prior Publication Data

US 2010/0037131 A1   Feb. 11, 2010

(51) Int. Cl.
*G06F 17/00* (2006.01)
(52) U.S. Cl. ......... 715/235; 715/243; 715/748; 715/810
(58) Field of Classification Search .................. 715/235, 715/273, 731, 762, 764, 780, 809
See application file for complete search history.

(56) References Cited

U.S. PATENT DOCUMENTS

| | | |
|---|---|---|
| 5,552,994 A | 9/1996 | Cannon et al. |
| 5,600,563 A | 2/1997 | Cannon et al. |
| 5,748,484 A | 5/1998 | Cannon et al. |
| 5,751,590 A | 5/1998 | Cannon et al. |
| 2002/0059340 A1* | 5/2002 | Centrone .................... 707/501.1 |
| 2002/0178078 A1* | 11/2002 | OToole .......................... 705/26 |
| 2003/0221162 A1 | 11/2003 | Sridhar |
| 2004/0107125 A1 | 6/2004 | Guheen et al. |
| 2006/0178918 A1 | 8/2006 | Mikurak |
| 2006/0190808 A1 | 8/2006 | Balthaser |
| 2008/0294977 A1* | 11/2008 | Friedman et al. ............. 715/224 |
| 2009/0327351 A1* | 12/2009 | Malone et al. ............. 707/104.1 |

FOREIGN PATENT DOCUMENTS

| | | |
|---|---|---|
| AU | 675344 | 2/1995 |
| CA | 2166963 | 1/1995 |

OTHER PUBLICATIONS

"PCT Search Report and Written Opinion", Search Report and Written Opinion mailed Sep. 15, 2009 for PCT/US09/53224, 12 pages.

* cited by examiner

*Primary Examiner* — Quoc A Tran
(74) *Attorney, Agent, or Firm* — Xin Wen

(57) ABSTRACT

A system and method are described for creating personalized stationery online. For example, a computer-implemented method according to one embodiment comprises: defining variable types including formatting options to be used in stationery templates; specifying variables to be used for a particular stationery template, each of the variables being assigned a particular variable type; creating a global template for a product category of stationery; extracting metadata from a file or other content provided by a stationery designer; and creating a product template using information contained in the global template and the metadata extracted from the file.

21 Claims, 18 Drawing Sheets

Fig. 6a

| Question/Answer Name | Codes | Code/Value | | Required |
|---|---|---|---|---|
| Do you want to include the baby's siblings? | _NUMSIBLINGS_ | | | 0 |
| A1: No | Value=A1 | | | |
| A2: Yes, one big brother | Value=A2 | | | |
| A3: Yes, one big sister | Value=A3 | | | |
| A4: Yes, multiple siblings | Value=A4 | | | |
| Variable/Question/Condition | Code/Value | | | |
| Do you want to include the baby's siblings? | _C1_ | We welcome with love | delete | |
| EQUALS: No | | | | |
| Default ● | | | | |
| EQUALS: Yes, one big brother | | _SIBLING_ has a new baby brother | | |
| Default ○ | | | | |
| EQUALS: Yes, one big sister | | _SIBLING_ has a new baby brother | | |
| Default ○ | | | | |
| EQUALS: Yes, multiple siblings | | _C3_C4_ welcome their baby brother | | |
| Default ○ | | | | |
| birth time | _C2_ | at_BIRTHTIME_ | delete | |
| NOT EQUAL: BLANK | | | | |
| sibling name 3 | _C3_ | _SIBLING1_and_SIBLING2_ | delete | |
| EQUALS: | | | | |
| sibling name 3 | _C4_ | _SIBLING1_,_SIBLING2_and_SIBLING3_ | delete | |
| NOT EQUAL: | | | | |

| Question/Answer Name | Codes | | Required |
|---|---|---|---|
| Do you want to include the baby's siblings? | _NUMSIBLINGS_ | | 0 |
| Variable/Question/Condition | Code/Value | | |
| | _C1_ | | |
| EQUALS: No<br>Default ● | | We welcome with love | |
| EQUALS: Yes, one big brother<br>Default ○ | | _SIBLING_ has a new baby sister! | |
| EQUALS: Yes, one big sister<br>Default ○ | | _SIBLING_ has a new baby sister! | |
| EQUALS: Yes, multiple siblings<br>Default ○ | | _C3_C4_ welcome their baby sister | |
| sibling name 3 | _C2_ | | |
| EQUALS: NULL | _SIBLING1_ and _SIBLING2_ | | |
| sibling name 3 | _C3_ | | |
| NOT EQUAL: NULL | _SIBLING1_, _SIBLING2_ and _SIBLING3_ | | |
| birth time | _C4_ | | |
| NOT EQUAL: BLANK | at _BIRTHTIME_ | | |

SYSTEM AND METHOD FOR DESIGNING AND GENERATING ONLINE STATIONERY

BACKGROUND

1. Field of the Invention

This invention relates generally to the field of data processing systems. More particularly, the invention relates to an improved architecture and method for designing and generating online stationery.

2. Description of the Related Art

Web-based systems for designing stationery such as wedding invitations, birth announcements, birthday party invitations, etc, are currently available over the Internet. As illustrated in FIG. 1, in current Web-based systems, a template designer 110 creates a static design template 120 for each type of stationery. The static design template 120 includes a plurality of text box regions 121, 122, 124 representing locations where text is to be displayed and potentially one or more image regions 124 representation locations where images uploaded by the user are to be displayed.

The static design template 120 is personalized via a Web-based user interface 130 made accessible to end users 111 over the Internet. The Web-based interface typically takes the form of a Web page which is downloaded to a client computer of the end user 111. The Web page includes a plurality of text entry fields 131, 132, 134 which correspond to the text box regions 121, 122, 124 within the design template, respectively. The Web page may also include one or more image entry fields 133 corresponding to the image regions 123 of the static design template 120. Images may be uploaded to the image entry field 133 and positioned within the image region 123 of the design template 120.

One problem with the current Web-based systems from a design perspective is that they lack flexibility. For example, a new static design template must be created in order to provide each new type of stationery (e.g., a new birth announcement, wedding invitation, etc). Moreover, from the user's perspective, current approaches do not provide guidance on appropriate text to enter into the text entry fields or how the text should be formatted. In addition, it is difficult to store the text entered by the user in one design and apply it to another design because the layout of the text and formatting in terms of font, color and size are different.

Accordingly, what is needed is an improved system for designing and generating online stationery.

BRIEF DESCRIPTION OF THE DRAWINGS

A better understanding of the present invention can be obtained from the following detailed description in conjunction with the following drawings, in which:

FIGS. 6a-b illustrate a portion of an etiquette wizard employed in one embodiment of the invention.

FIGS. 7a-c illustrate another portion of a global template wizard employed in one embodiment of the invention.

FIGS. 8a-d illustrate a product template wizard according to one embodiment of the invention.

FIGS. 9a-9d illustrate exemplary Web pages relating to a data entry wizard according to the present invention.

DETAILED DESCRIPTION OF PREFERRED EMBODIMENTS

Described below is a system and method for designing and presenting online stationery. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

An Exemplary Network Architecture

Figure 1:
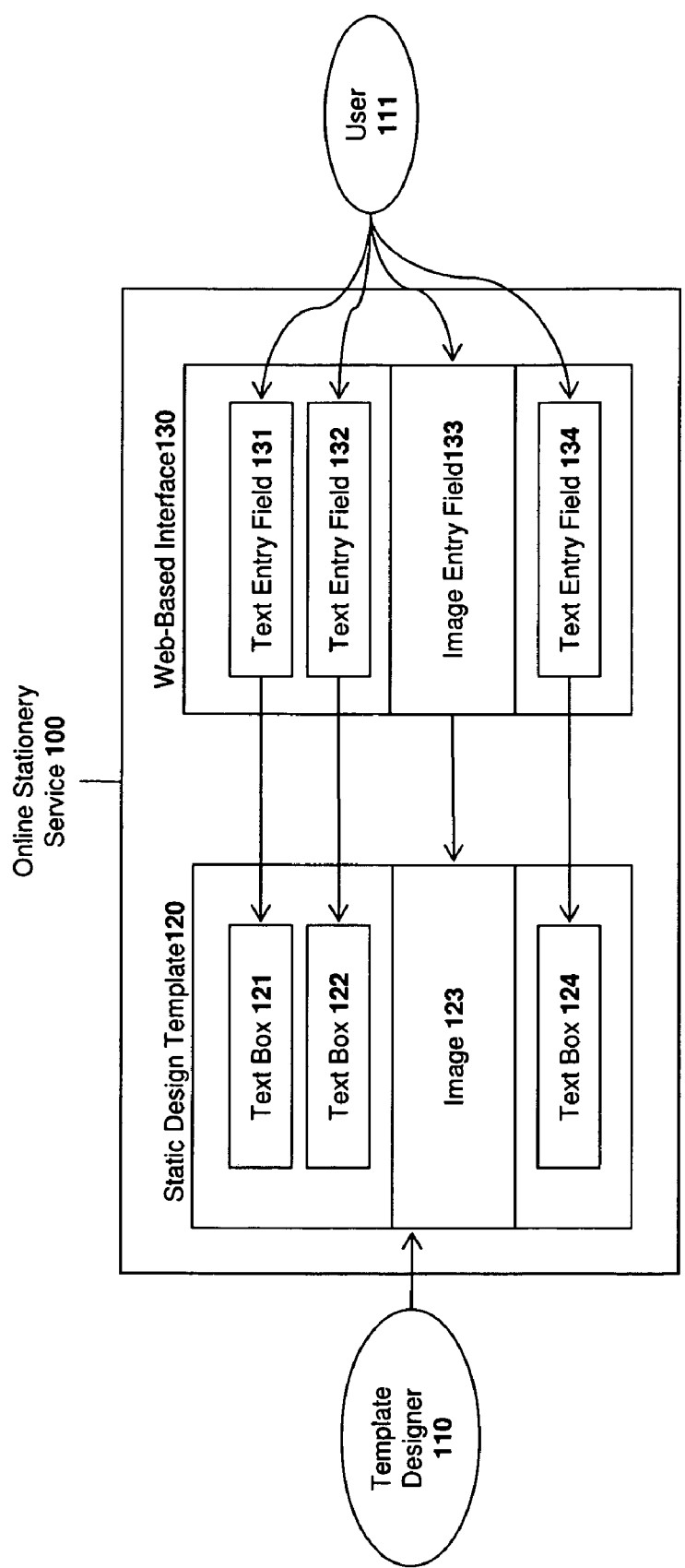
FIG. 1 illustrates a prior art system architecture for generating online stationary.
Figure 2:
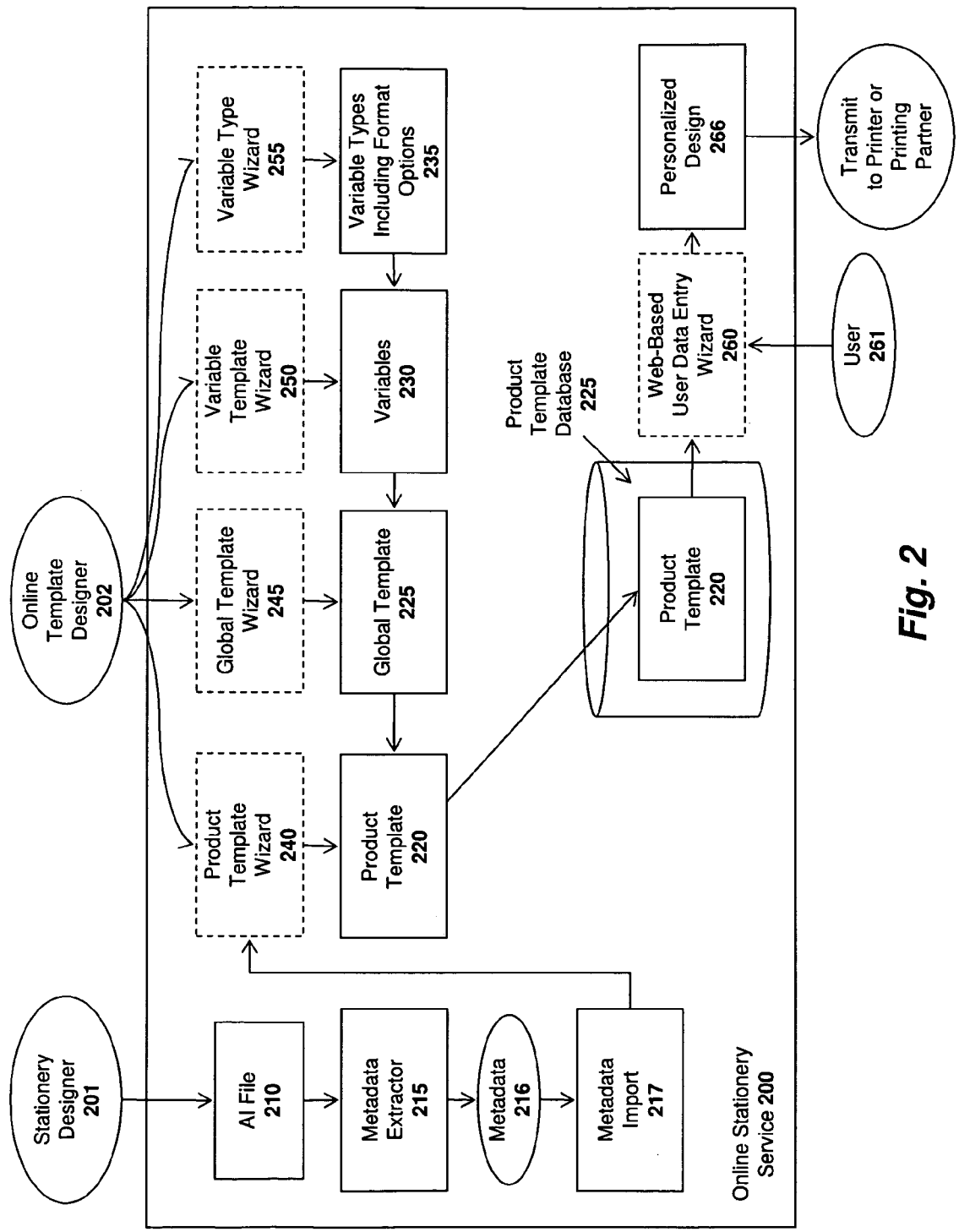
FIG. 2 illustrates a system architecture according to one embodiment of the invention.

One embodiment of a system for generating stationery is illustrated in FIG. 2. The system provides support for two types of designers: stationery designers 201 who create new forms of stationery (e.g., new birth announcements, wedding invitations, etc), and online template designers 202 who create online templates using the designs provided by the stationery designers. The system includes a series of wizards 240, 245, 250, 255 to allow template designers 202 to efficiently design new product templates 220. In one embodiment, the wizards comprise software executed by a general purpose or special purpose processor. However, the underlying principles of the invention are not limited to a software implementation.

Each product template 220 embodies a unique stationery design such as a particular birth announcement or wedding invitation. Once completed, the product template 220 is stored within a product template database 225 and made accessible to end users 261 via a Web-based user data entry wizard 260. In one embodiment of the invention, the user data entry wizard 260 comprises a series of interrelated Web pages transmitted in succession to end users over the Internet. It should be noted, however, that the underlying principles of the invention are not limited to an Internet-based or Web-based implementation. After all of the required information has been collected from a user 261, a final, personalized design 266 containing the user-specific information is generated and sent to a printer or a printing partner over the Internet.

In one embodiment of the invention, a stationery designer 201 creates new stationery designs using an application such as Adobe® Illustrator® and uploads a file 210 containing the design to the online stationery service 200. In the example shown in FIG. 2, an Adobe Illustrator (AI) file 210 is used. It should be noted, however, that the underlying principles of the invention are not limited to any particular design format. A metadata extractor 215 executed on the online stationery service 200 extracts metadata 216 describing the new design in a non-proprietary, open format such as an Extensible Markup Language (XML) format. The metadata contains attributes for groups of text and graphics such as font, font size, leading, and coordinates. Metadata import logic 217 then parses the XML file, extracts the metadata and imports the metadata into the product template 220 (described in greater detail below).

FIG. 2 illustrates four different types of wizards employed in one embodiment of the invention: a variable type wizard 255 for creating new variable types 235, a variable template wizard 250 for creating new variables 230, a global template wizard 245 for creating global design templates 225, and a product template wizard 240 for creating product templates 220.

Figure 4:
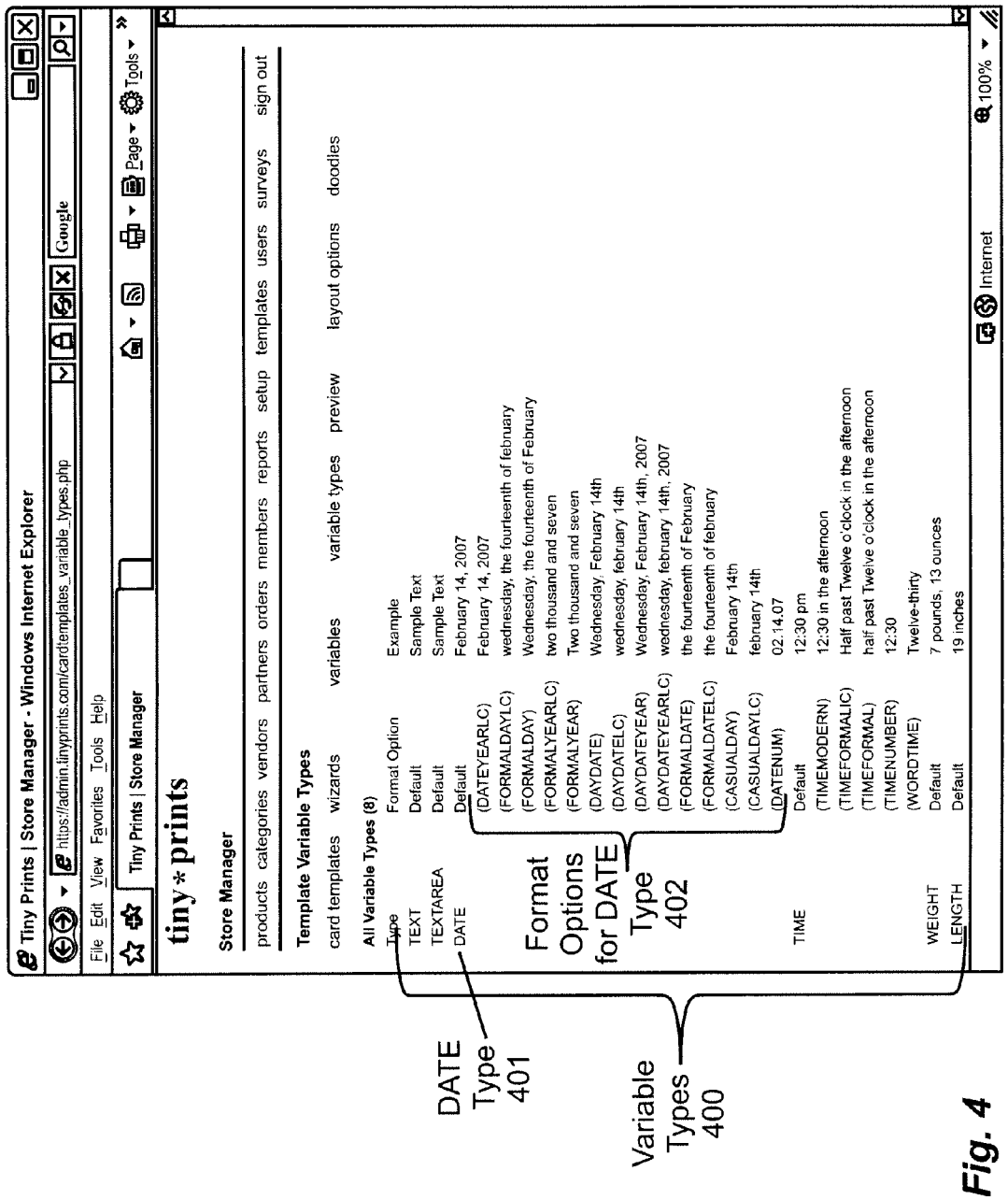
FIG. 4 illustrates one embodiment of the invention which supports template variable types including format options.

According to the embodiments of the invention described herein, the variable type wizard 255 allows template designers to create new variable types. The new variable types may then be stored and used in subsequent template designs. As illustrated in FIG. 4, in one embodiment, a plurality of format options 402 are specified for each variable type 400. For example, 14 different format options are specified for the variable type DATE including formal options (e.g., FORMALDAY), and casual options (e.g., CASUALDAY). Examples of how the date will be displayed on the stationery are provided for each format option. The format options may include the manner in which the text information is conveyed (e.g., "Wednesday, the fourteenth of February" for FORMALDAY) as well as text formatting options such as font type, font size and text highlighting (e.g., bold, italics, underline).

Once variable types and associated formatting options have been created, the variable template wizard 250 allows the template designer 202 to define variables for each new template. Each variable is assigned a particular variable type. Returning to the previous example, to include a "date" field within a design template, the template designer would create a variable of the variable type DATE and might also specify the particular format options to be used (e.g., FORMALDAY). The design process is streamlined in this manner because the format options are provided automatically upon selection of the variable type DATE. That is, the designer does not need to recreate the format options for the date because they are inherent in the DATE variable type.

Figure 5:
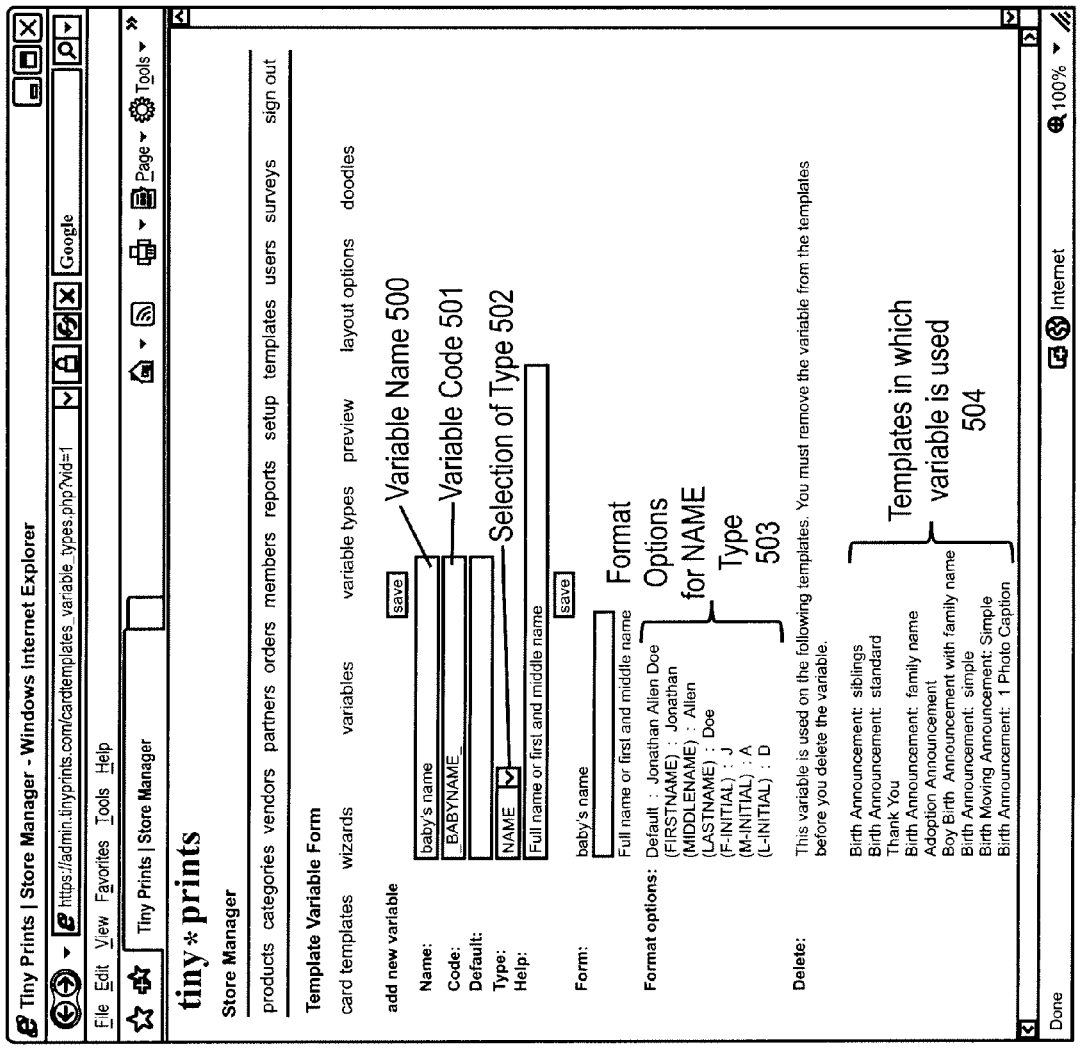
FIG. 5 illustrates one embodiment of the invention which supports variables.

One embodiment of the variable template wizard 250, illustrated in FIG. 5, provides a field 500 for entering a new variable name ("baby's name"), a variable code 501 ("_BABYNAME_"), and a drop down menu 502 for linking the new variable to a particular variable type. In one embodiment, the drop down menu 502 provides a list of all variable types previously created and stored on the online stationery service 200. In the particular example illustrated in FIG. 5, the NAME variable type has been selected, and a plurality of format options 503 associated with the NAME variable type are displayed for the designer. In this case, the format options include those for names which are frequently used in stationery designs including First Name, Middle Name, Last Name, and First, Middle and Last initials.

Once variable types and variables have been defined, the global template wizard 245 is used for designing new global templates 225 and the product template wizard 240 is used for designing new product templates 220. Each product template 220 is unique, representing a completed stationery design offered to users. By contrast, each global template 225 may be reused in multiple different product templates. By way of example, a global template for a birth announcement contains the information typically required for any birth announcement (e.g., name, birth date, etc) and the product template contains information specific to a particular stationery design (e.g., image position, specific text location and formatting, etc).

Figure 6A:
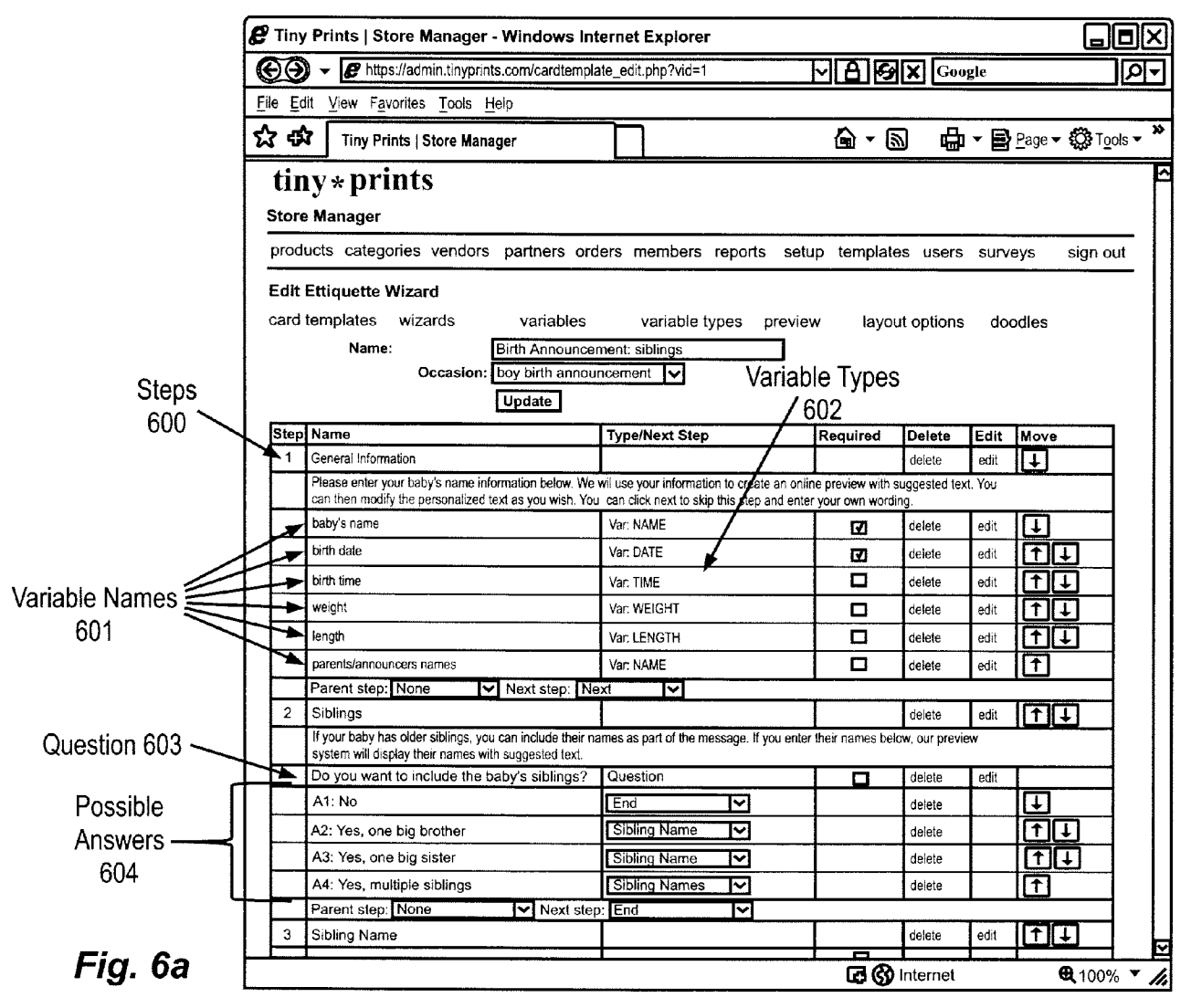
Figure 6B:
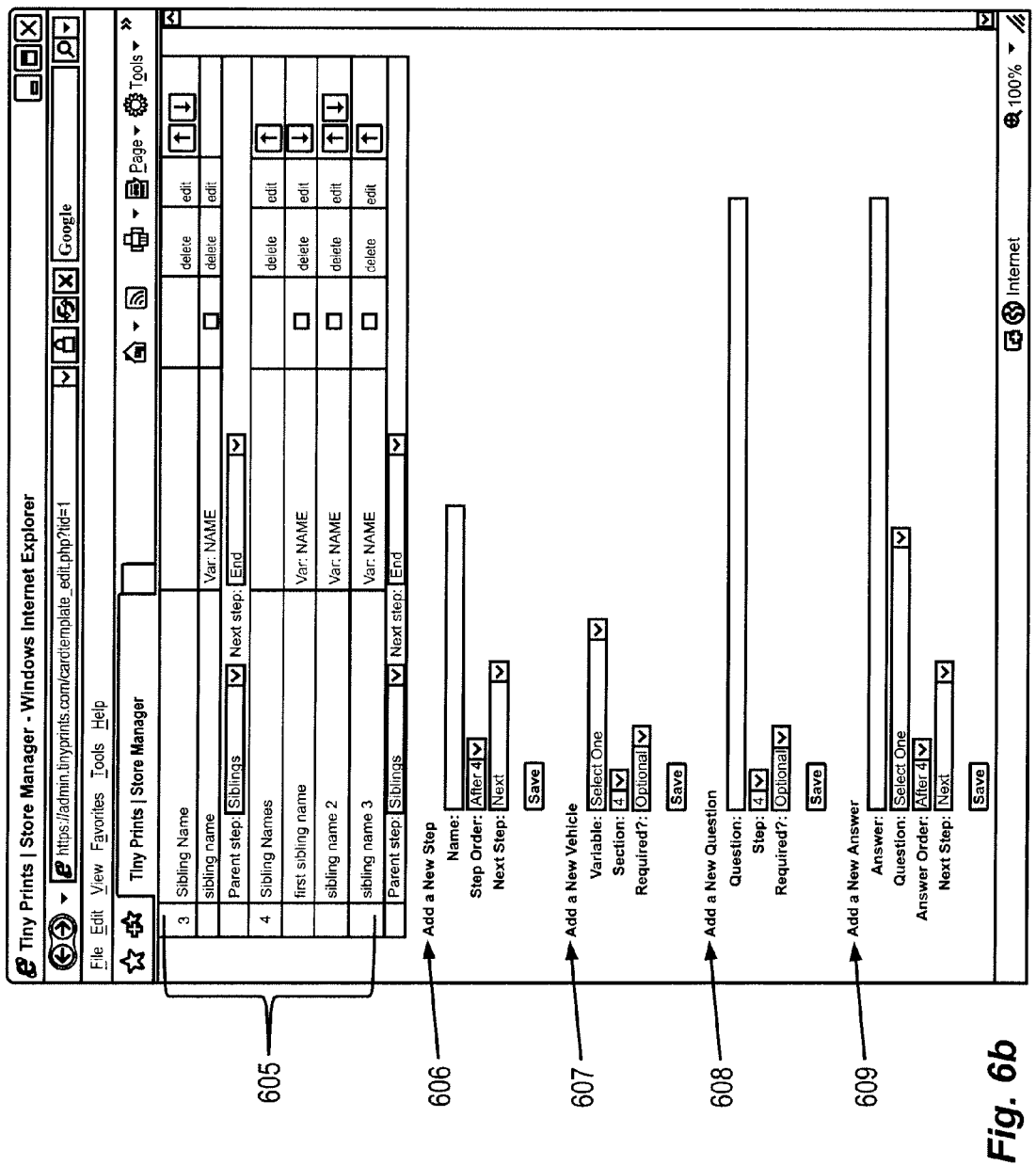

FIGS. 6a-b and 7a-c illustrate different components of an exemplary global template wizard for a birth announcement which includes information about siblings (named "Birth Announcement: siblings"). As illustrated in FIG. 6a (which shows the "Edit Etiquette Wizard") the template designer creates a series of steps 600 to collect information from the end user. The first step (1) includes a series of variable names 601 which will are ultimately mapped to data entry fields within the Web-based user data entry wizard 260. As mentioned above, each variable is assigned a specific variable type. For example, the variable "baby's name" is designated type NAME; "birth date" is designated type DATE; "birth time" is designated type TIME; "weight" is designated type WEIGHT; "length" is designated type LENGTH; and "parents/announcers" names is designated type NAME. As mentioned above, each variable type may specify a plurality of different formatting options such as text layout and appearance.

The second step includes a question: "Do you want to include the baby's siblings?" 603 followed by a series of possible answers 604. In response to one of the answers ("No"), no additional data entry is required. However, several of the answers correspond to new variables, as defined in steps 3 and 4 (see FIG. 6b). For example, step 3 specifies that the variable "sibling name" is type NAME and step 4 specifies three variables for multiple sibling names: "first sibling name," "sibling name 2" and "sibling name 3," each of which are type NAME.

Also shown in FIG. 6b is an option to add a new step to the global template 606, an option to add a new variable 607, an option to add a new question 608, and an option to add a new answer 609. As illustrated, the template designer may specify the order in which the new steps and answers will appear within the Web-based user data entry wizard 260 and may designate variables and questions as either "required" (i.e., the user must enter a value) or "optional." If a variable or question within a global template 225 is optional, then the user may proceed to the next step with or without entering a value. As illustrated in FIGS. 6a-b, check boxes are provided for each variable and question to indicate whether the variable/question is required or optional. Options are also provided to delete or edit existing questions or variables and to move the question or variable up or down within a step.

Figure 7A:
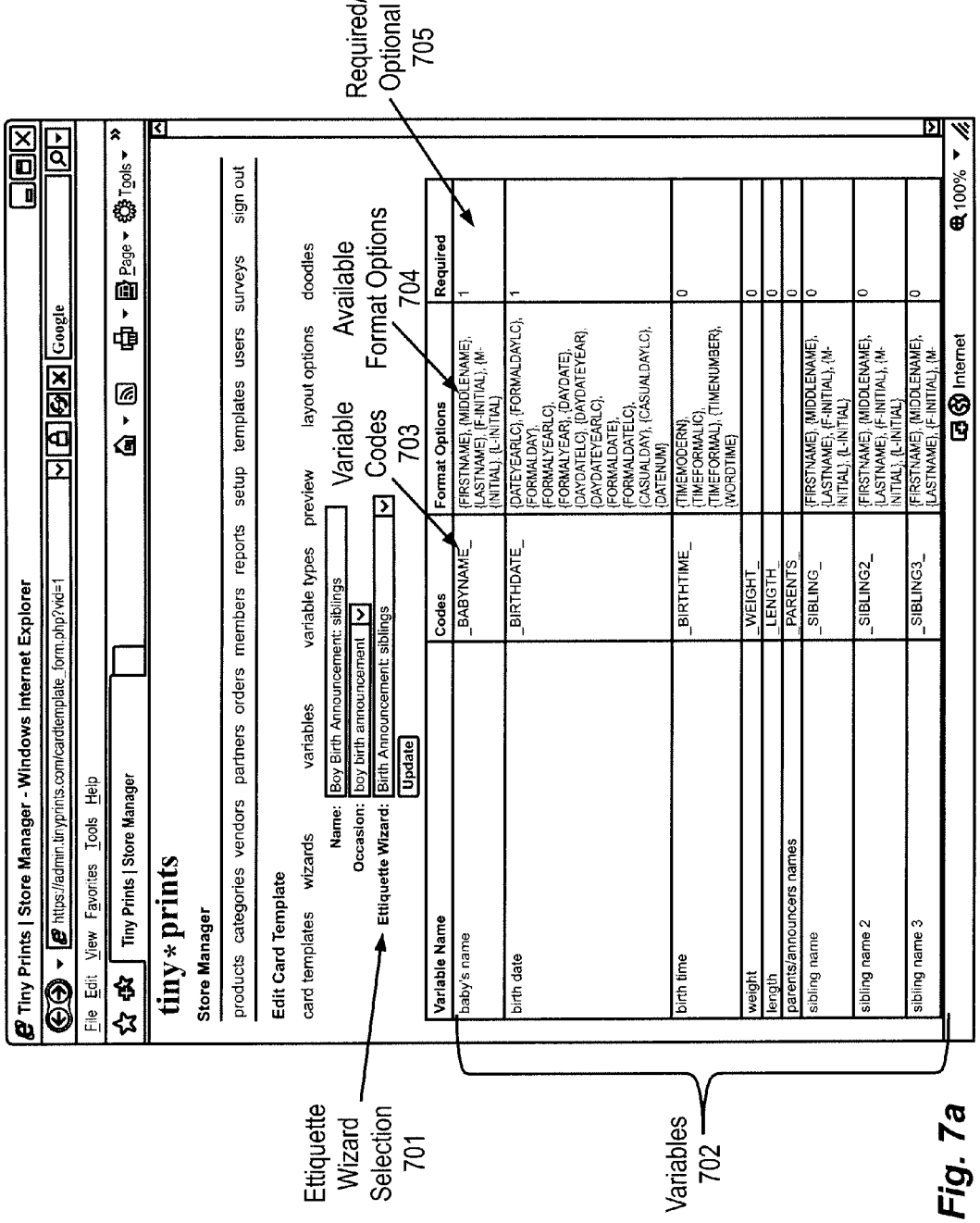
Figure 7C:
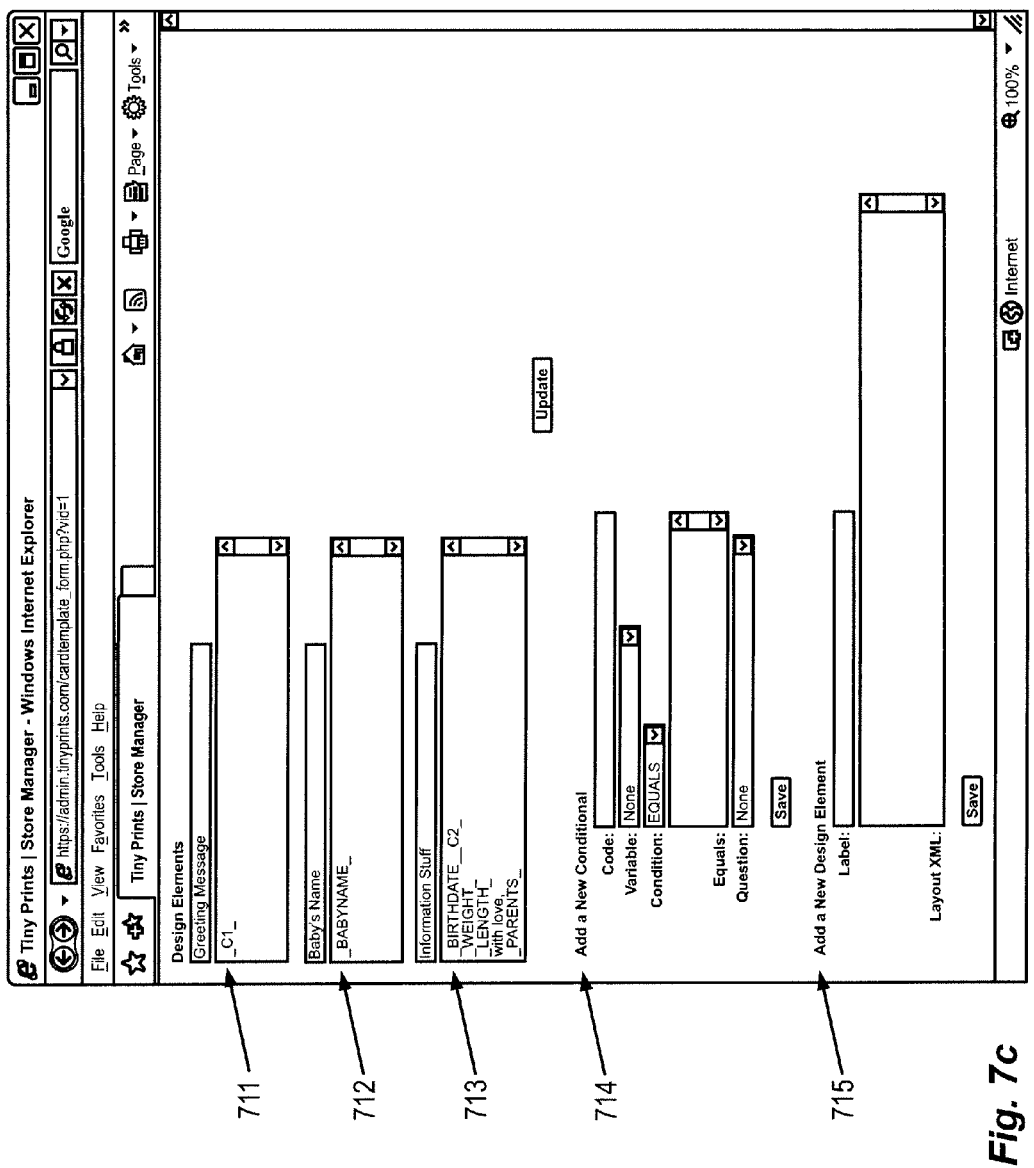

FIGS. 7a-c illustrate a second component of the global template wizard which performs conditional operations on the data entered by the user via the Etiquette Wizard (FIGS. 6a-b). After specifying a name and occasion for the global card template, a drop down menu 701 is provided to specify the Etiquette Wizard to be used for the global card template. In this case, the "Birth Announcement: siblings" template illustrated in FIGS. 6a-b has been selected. Consequently, the variables 702 from the global template are imported into the global template along with corresponding codes 703, formatting options 704 (i.e., as specified by the designated variable type) and an indication as to whether the variable is required or optional 705.

As illustrated in FIG. 7b, questions and answers are also imported from the etiquette wizard into the global card template. In region 706, the variable identified by the code _NUMSIBLINGS_ is set based on answers provided by the end user. For example, if the answer to the question "Do you want to include the baby's siblings?" is "Yes, one big brother," then the variable _NUMSIBLINGS_ is set to the answer. In region 707, the text to be displayed in response to the answer is defined. For example, in response to the answer "Yes, one big brother" the code value _C1_ is set to "_SIBLING_ has a new baby brother" where _C1_ is a string displayed within the template design and _SIBLING_ is the name of the new baby's brother. As shown in FIG. 7c, the product template wizard provides a "design elements" section comprised of fields in which codes specified in FIG. 7b are specified. In this case, the code "_C1_" results in the text "_SIBLING_ has a new baby brother" displayed on the final design template (where _SIBLING_ is the name of the baby's sibling).

Additional variables C2, C3 and C4 are set as shown within regions 708, 709 and 710, respectively, in FIG. 7b. The variable C2 is set to "at _BIRTHTIME_" where "_BIRTHTIME_" is the time of birth entered by the end user and variables C3 and C4 are used if more than one sibling name is required.

As shown in FIG. 7c, the end result is _C1_ ("_SIBLING_ has a new baby brother" in the illustrated example) followed by the baby's name (_BABYNAME_) as indicated at 712; the birth date followed by the birth time (_BIRTHDATE_ _C2_); the baby's weight (_WEIGHT_); length (_LENGTH_) and a message "with love _PARENTS_" where "_PARENTS_" represents a variable set to the names of the parents. Options are also provided to add a new conditional variable (714) or a new design element (715).

Returning to FIG. 2, in one embodiment of the invention, the product template wizard combines the metadata 216 extracted from the AI file 210 by metadata import logic 217 with the data entered by the online template designer 202 to create a new product template. The metadata 216 extracted from the AI file 210 comprises layout information describing where text and graphical elements should be positioned within the product template 220 (i.e., coordinate data), and data describing each text box and graphical element within the AI file. Returning to the above example, the metadata 216 provides coordinates for the location of the phrase "_SIBLING_ has a new baby brother" in the final product template 220. Similarly, the metadata 216 specifies the coordinates for any photographs used in the product template 220 and/or formatting information such as font, color and alignment of the text and graphics.

An exemplary product template wizard 240 is illustrated in FIGS. 8a-d. The template designer 202 specifies a global template to be used for the product template via a drop down menu 800. In this case, a global template for a girl birth announcement with siblings has been selected. A listing of all of the variables used in the product template is provided directly beneath the drop down menu. Separate columns are provided for the variable names 801, variable codes 802, format options 803, and an indication as to whether the variables are required 804.

As illustrated in FIG. 8b, questions and answers are also imported from the etiquette wizard into the product template. In region 806, the variable identified by the code _NUMSIBLINGS_ is set and the text to be displayed in response to user input is defined. For example, in response to the answer "Yes, one big brother" the code value _C1_ is set to "_SIBLING_ has a new baby sister" where _C1_ is a string displayed within the template design and _SIBLING_ is the name of the new baby's brother. Other codes illustrated in FIG. 8b include _C2_ for two siblings, _C3_ for three siblings, and _C4_ for birth time.

Figure 8A:
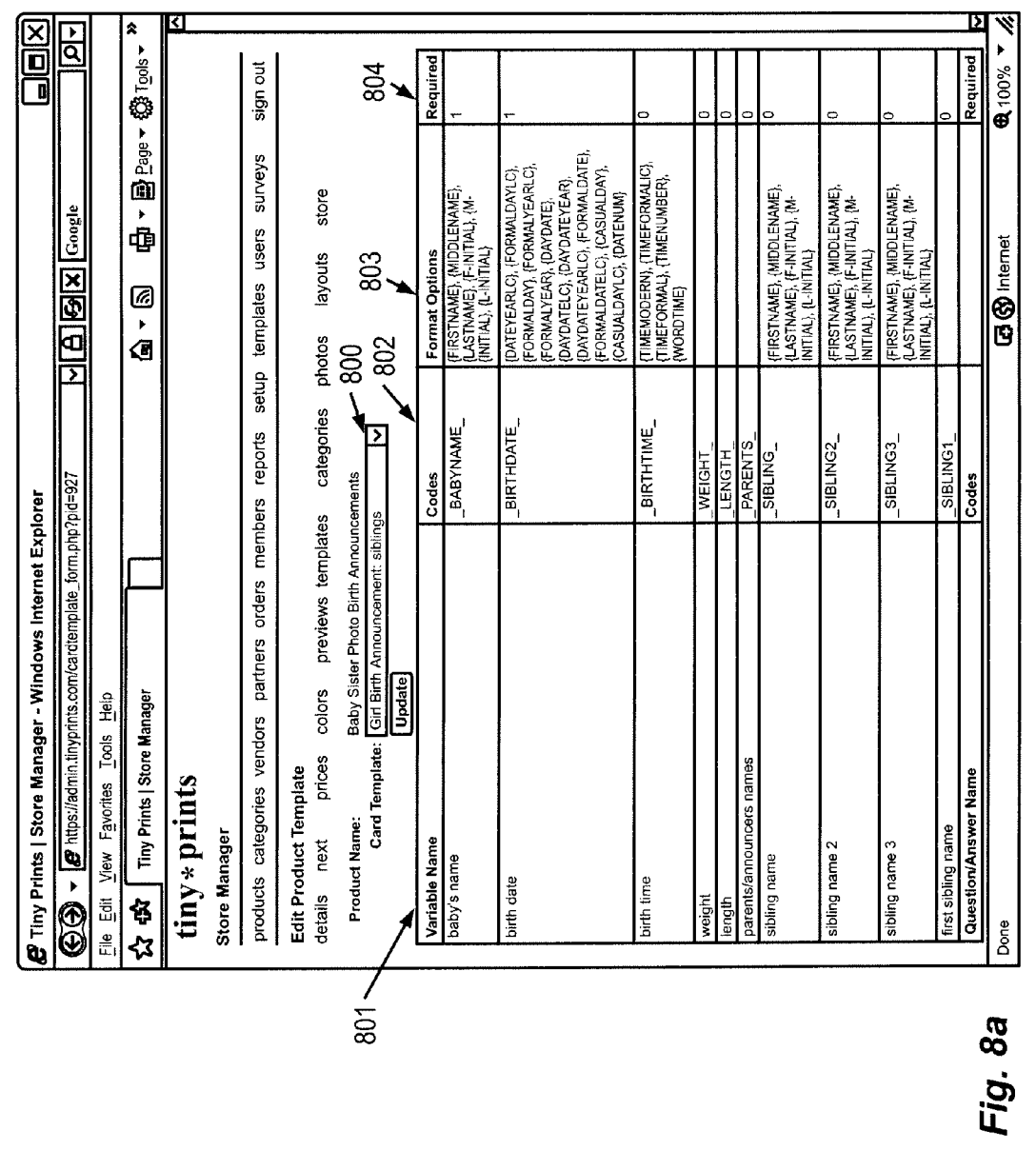
Figure 8C:
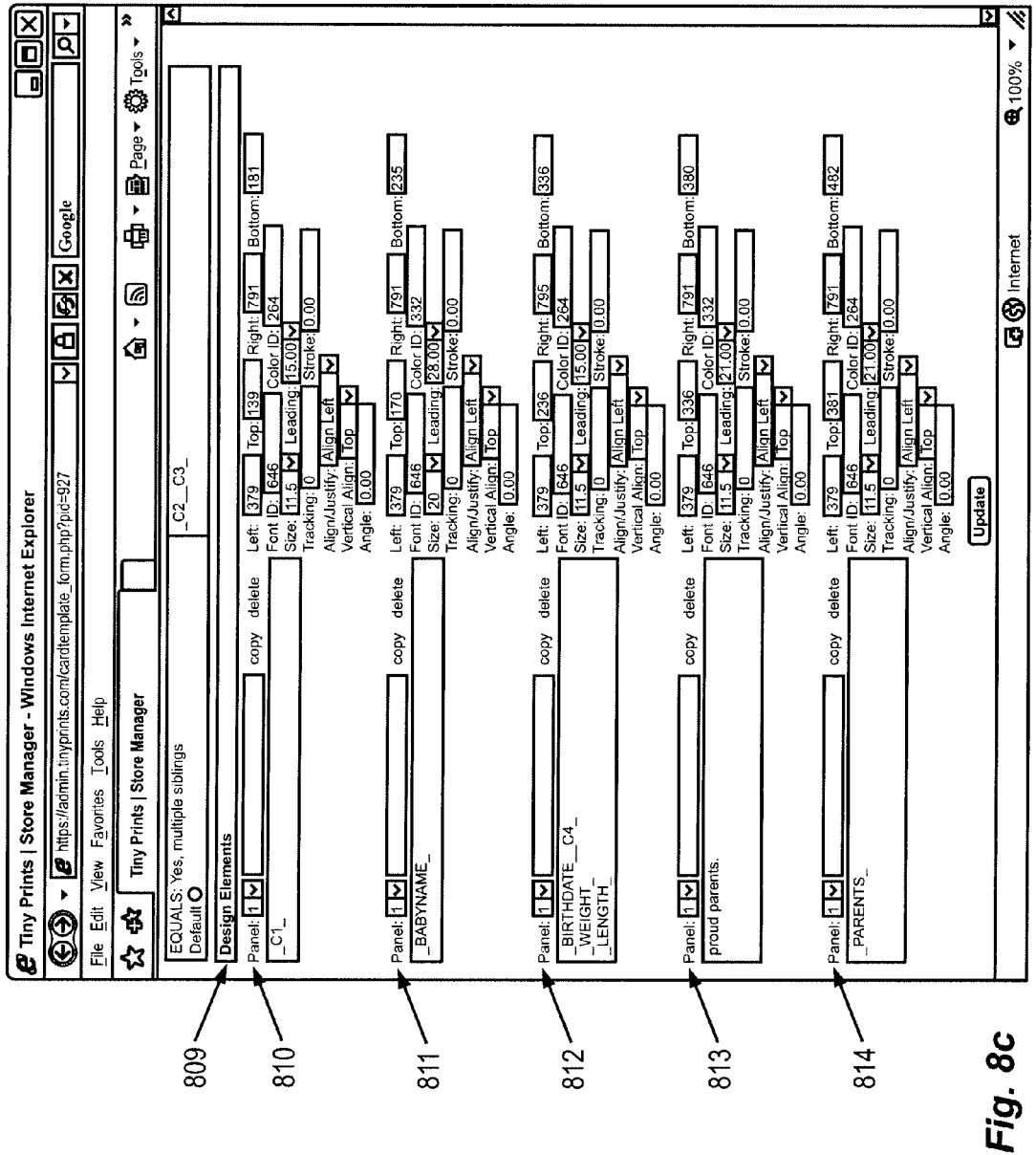

As shown in FIG. 8c, the product template wizard provides a "design elements" section 809 comprised of fields in which the codes evaluated in FIG. 8b are displayed. In this case, the code "_C1_" 810 results in the text "_SIBLING_ has a new baby sister" displayed on the final product template (where _SIBLING_ is the name of the baby's sibling). Additional codes and text integrated within design elements in FIG. 8c include the baby's name 811, birth date, weight, length 812, the text "proud parents" 813 and a code (_PARENTS_) for the parents names 814.

Each individual design element 810-814 includes information imported from the AI file 210 to define the positioning and look & feel of the product template. In the example shown in FIG. 8c, the information for each design element includes the coordinates of the text box in which the text of the design element should be positioned (as defined by left, top, right and bottom values), the font, the color, the size, the leading, tracking number, stroke, alignment information (e.g., left, right, justified), vertical alignment (e.g., top, bottom, center), and the angle at which the design element should be positioned. Using the product template wizard shown in FIG. 8c, the template designer adjusts any of the variables and/or text for each design element. Moreover, although not illustrated in FIG. 8c, separate design elements for images may be provided within the product template.

Figure 8D:
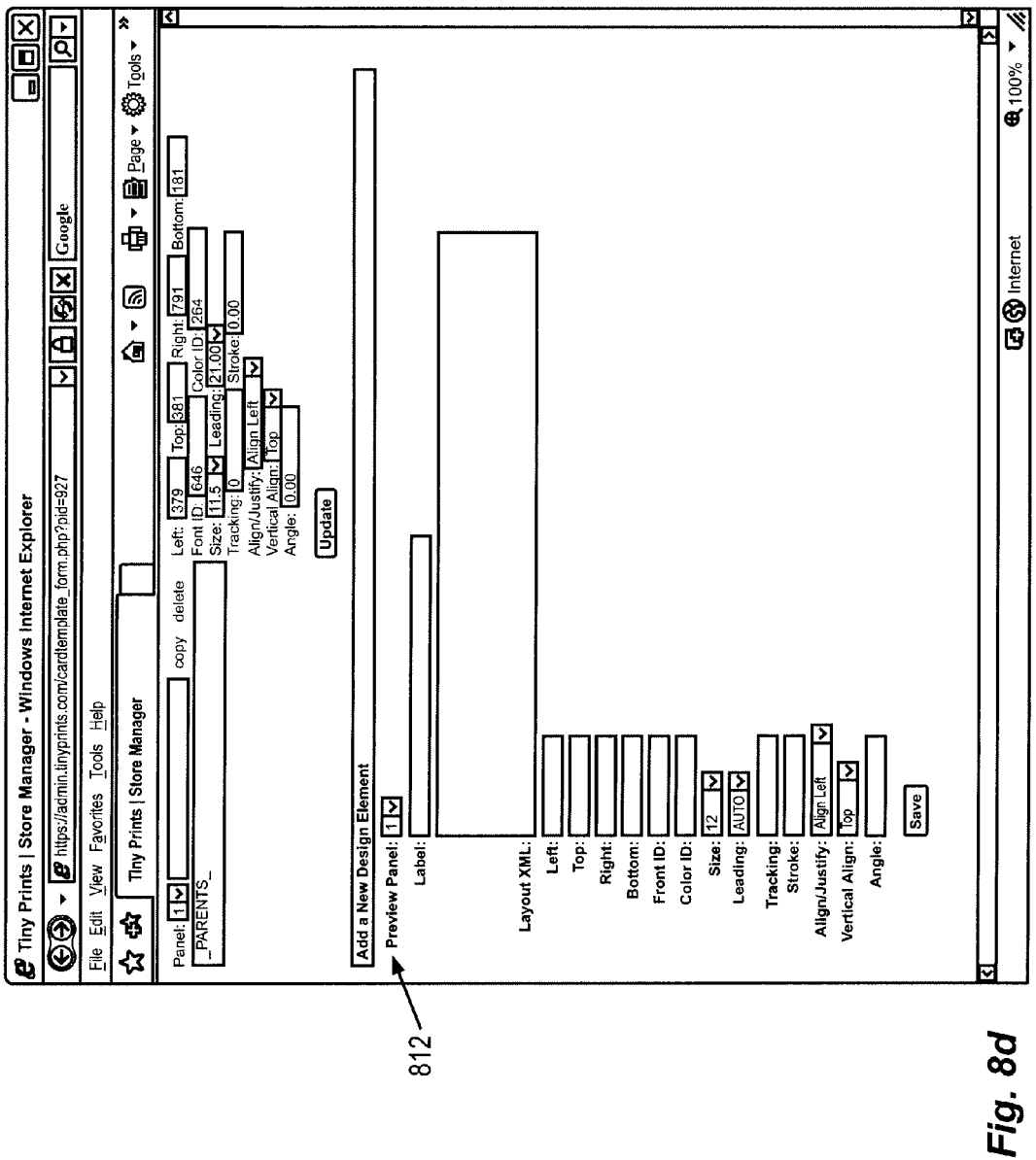

As illustrated in FIG. 8d, a design region 812 is provided to allow the template designer to specify one or more additional design elements. As shown, separate data entry fields are provided for each of the coordinate, text and other layout information described above (e.g., coordinates, fonts, text, color, etc). Once the information is input into the system, the template designer selects a "save" button to update the product template.

Figure 9A:
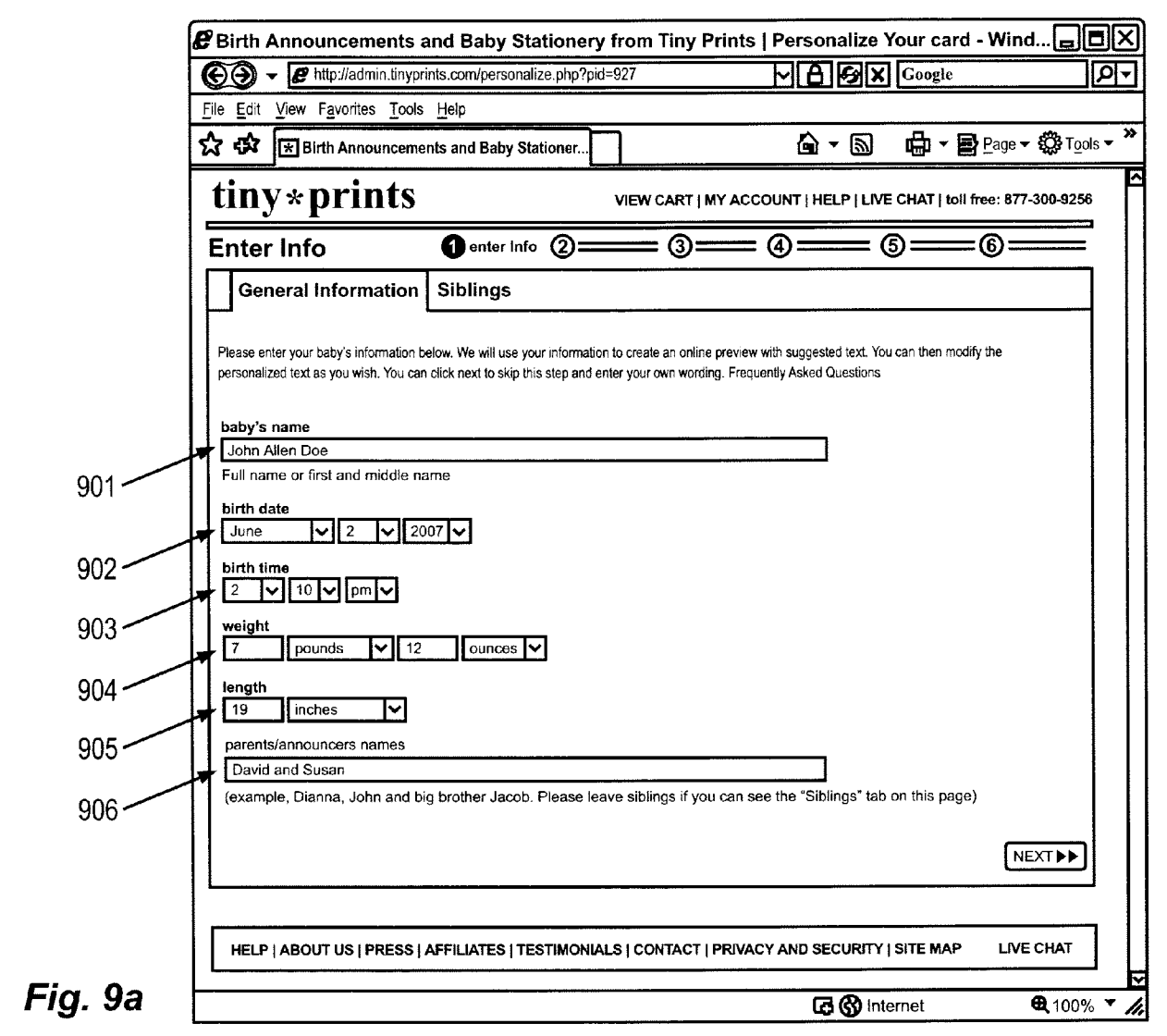
Figure 9B:
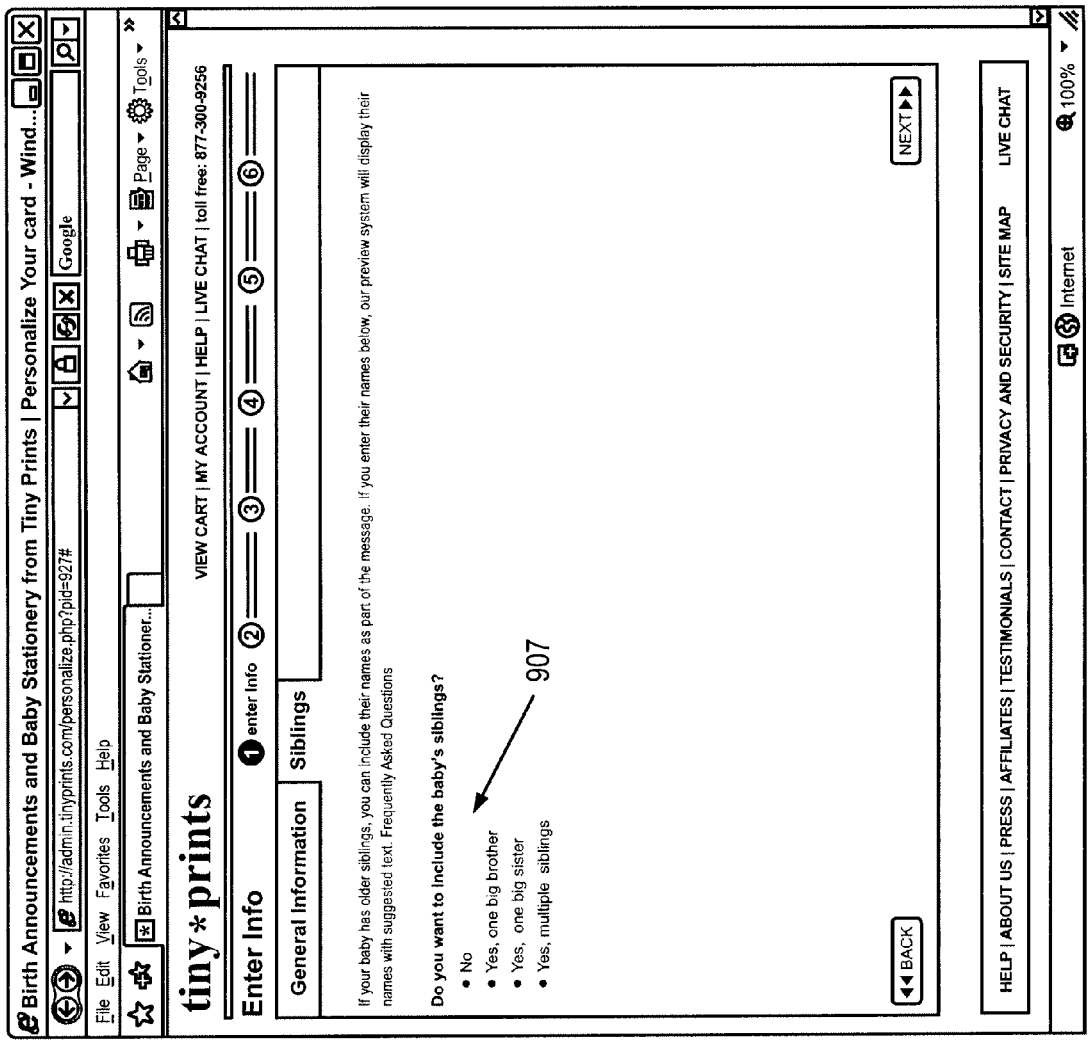
Figure 9C:
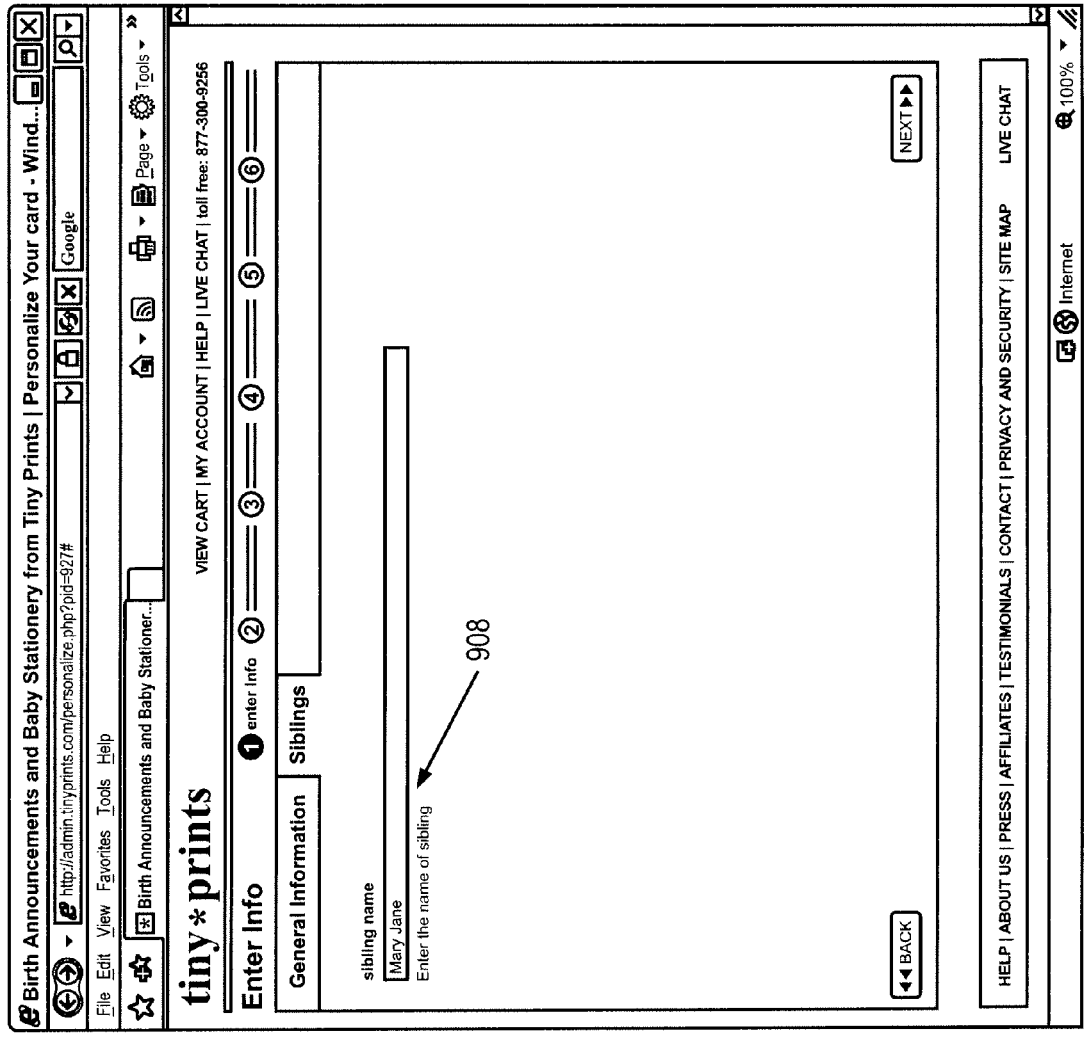
Figure 9D:
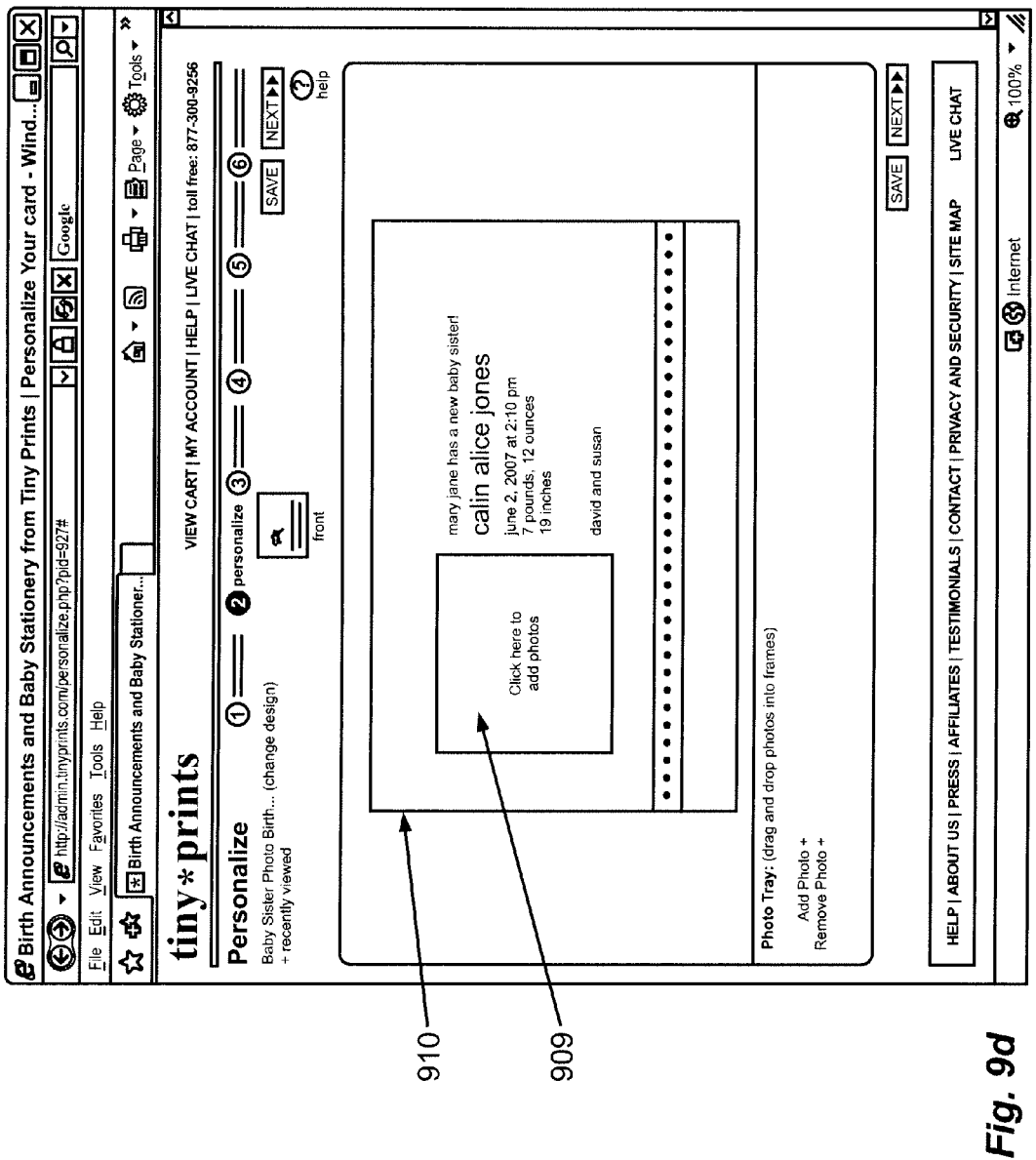

After the product template 220 is created, the Web-based user data entry wizard 260 requests the information needed to complete the personalized stationery design 266. In one embodiment, the Web-based user data entry wizard 260 transmits one or more Web pages containing questions and data entry fields, as specified by the product template (e.g., "Do you want to include the baby's siblings" as shown in FIG. 7b). An exemplary series of Web pages are illustrated in FIGS. 9a-d. FIG. 9a illustrates a plurality of data entry fields 901-906 into which the user enters information specified by the product template (e.g., baby's name 901, birth date 902, birth time 903, weight 904, length 905, and parents' names 906). FIG. 9b illustrates a question 907 ("Do you want to include the baby's siblings?"). As mentioned above, the product template performs a conditional analysis of the answer to the question to generate the personalized template design. Based on the answer to the question, another one or more data entry fields 908 may be provided as illustrated in FIG. 9c (in this case, the names of the siblings). FIG. 9d illustrates a preview of the personalized product template with text entered by the user inserted into the text areas with font, color, size and format as specified by the product template, and a region 909 into which the user may add a photo. After the user enters the requested information, a personalized stationery design 266 is generated and transmitted to a printer or a printing partner over the network. In one embodiment, the personalized design 266 is generated in the form of a PDF file. It should be noted, however, that the underlying principles of the invention are not limited to any particular personalized design format.

Figure 3:
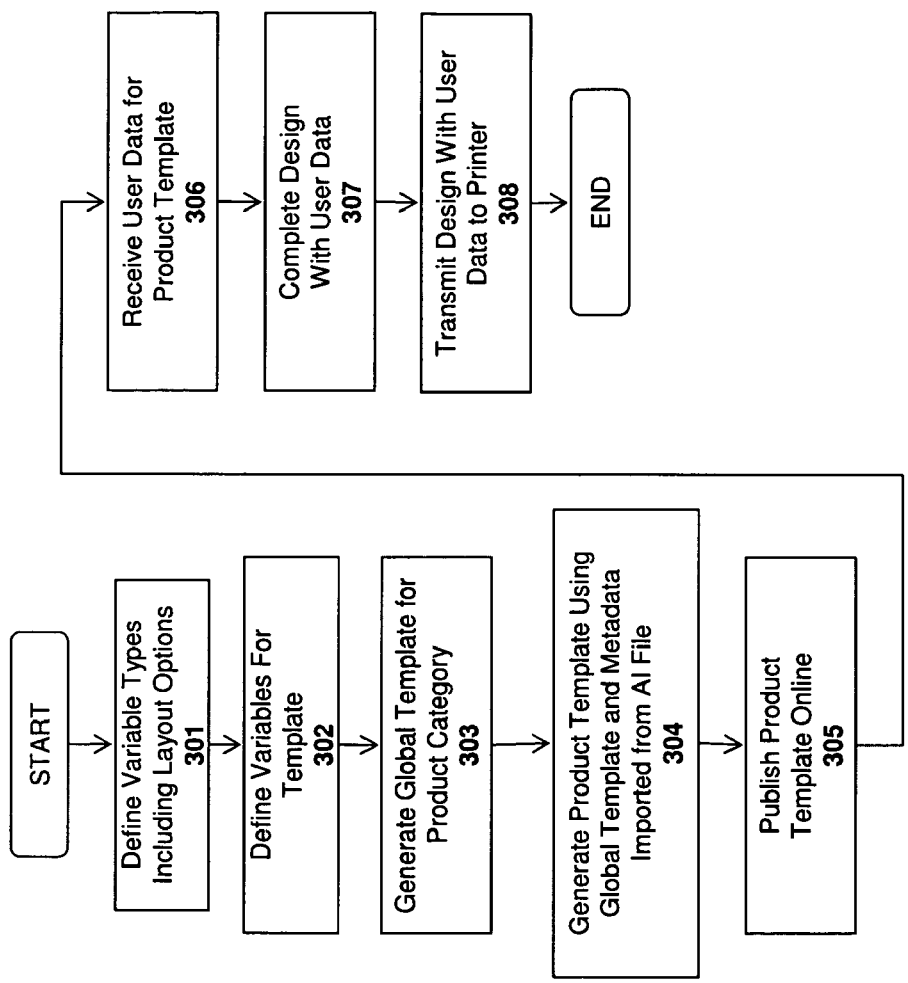
FIG. 3 illustrates a process according to one embodiment of the invention.

A method outlining the foregoing process is illustrated in FIG. 3. At 301 the template designer defines variable types including formatting options and at 302 the template designer specifies variables to be used for the template. At 303, the template designer creates the global template for the product category (e.g., boy birth announcement). At 304, the template designer creates the product template using information contained in the global template and the metadata extracted from the AI file (or other file type). At 305 the product template is published online. For example, an image of the stationery containing the design may be displayed on a Website and made accessible to end users. At 306, the user enters the data required to personalize the stationery such as names, dates, locations, and pictures. At 307, a personalized design is created with the user data and, at 308, the personalized design is sent to a printer and/or printing partner over a network.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules such as wizards and other logic may be implemented as software, hardware or any combination thereof. Accordingly, the scope and spirit of the invention should be judged in terms of the claims which follow.

What is claimed is:

1. A computer-implemented method for creating personalizable stationery product templates in a plurality of stationery product categories, comprising:
    defining, by a computer system comprising one or more servers, a global template that specifies a plurality of variables and formatting options for the variables;
    receiving a selection, by a template designer, of a first set of variables in the global template to create a first stationery product category;
    receiving a selection of a second set of variables in the global template to create a second stationery product category;
    receiving, by the computer system comprising one or more servers, a first product design in the first stationery product category and a second product design in the second stationery product category;
    extracting a first set of metadata from the first stationery product design;
    extracting a second set of metadata from the second stationery product design;
    creating a first stationery product template using the first set of metadata and the first set of variables in the global template; and
    creating a second stationery product template using the second set of metadata and the second set of variables in the global template,
    wherein each of the first stationery product template or the second stationery product template is configured to receive data from a user to create a personalized stationery product.

2. The computer-implemented method as in claim 1, wherein the first set of variables or the second set of variables receive the data from the user as input value to form a personalized stationery product.

3. The computer-implemented method as in claim 2, wherein the global template defines an operation of a first variable in the first set of variables which depends on the input value to a second variable in the first set of variables.

4. The computer-implemented method as in claim 3, wherein the operation comprises if user's data is required to be received from the user as input to the first variable.

5. The computer-implemented method as in claim 3, wherein the global template defines that user's data is to be received as input value to the second variable before any user data is received as input value to the first variable.

6. The computer-implemented method as in claim 1, wherein the global template is set up by an online stationery product provider using the computer system, wherein the steps of selecting, by a template designer, a first set of variables in the global template, the step of selecting a second set of variables in the global template, and the step of receiving are performed using a secure Web browser access to the online stationery product provider.

7. The computer-implemented method as in claim 1, wherein the global template is set up by an online stationery product provider using the computer system, wherein the data is received from the user over the World Wide Web.

8. The computer-implemented method as in claim 1, wherein the global template comprises a series of questions to collect the data from the user, wherein values of the first set of variables are conditional based on the user's answers to the series of questions.

9. The computer-implemented method as in claim 1, wherein the formatting option specifies how data received from the user is to be formatted in the first stationery product template and the second stationery product template.

10. The computer-implemented method as in claim 1, wherein the first set of metadata comprises font type, font size, coordinates, and color for a text in the first product design.

11. The computer-implemented method as in claim 1, wherein the global template defines variable types, and wherein each of the plurality of variables is defined in one of the variable types, and wherein each of the variable types is associated with one or more formatting options.

12. The computer-implemented method as in claim 11, wherein the variable types include one or more of a name, a sibling's name, a date, a time of the day, a weight of a baby, or a length of a baby.

13. The computer-implemented method as in claim 12, wherein the formatting options for a date comprise a first option of represent day, month and year with words and a second option of representing day, month and year using Arabic numbers.

14. The computer-implemented method as in claim 2, further comprising:
    publishing the first stationery product template online to allow the user to send the data to the computer system.

15. A computer-implemented method for creating personalizable stationery product templates in a plurality of stationery product categories, comprising:
    defining, by an online stationery product provider using a computer system comprising one or more servers, a global template that specifies a plurality of variables, variable types, and one or more formatting options for each variable types, wherein each of the plurality of variables is defined in one of the variable types;
    receiving a selection, by a template designer, of a first set of variables in the global template to create a first stationery product category;

receiving a selection of a second set of variables in the global template to create a second stationery product category;

receiving, by the computer system comprising one or more servers, a first product design in the first stationery product category and a second product design in the second stationery product category;

extracting a first set of metadata from the first stationery product design;

extracting a second set of metadata from the second stationery product design;

creating a first stationery product template using the first set of metadata and the first set of variables in the global template;

creating a second stationery product template using the second set of metadata and the second set of variables in the global template; and publishing the first stationery product template or the second stationery product template online to receive data as input to the first set of variables or the second set of variables from a user to create a personalized stationery product.

16. The computer-implemented method as in claim 15, wherein the global template defines an operation of a first variable in the first set of variables which depends on the input value to a second variable in the first set of variables.

17. The computer-implemented method as in claim 16, wherein the operation comprises if user's data is required to be received from the user as input to the first variable.

18. The computer-implemented method as in claim 16, wherein the global template defines that user's data is to be received as input value to the second variable before any user data is received as input value to the first variable.

19. The computer-implemented method as in claim 15, wherein the steps of selecting, by a template designer, a first set of variables in the global template, the step of selecting a second set of variables in the global template, and the step of receiving are performed using a secure Web browser access to the online stationery product provider.

20. The computer-implemented method as in claim 15, wherein the global template is set up by an online stationery product provider using the computer system, wherein the data is received from the user over the World Wide Web.

21. The computer-implemented method as in claim 15, wherein the global template comprises a series of questions to collect the data from the user, wherein values of the first set of variables are conditional based on the user's answers to the series of questions.

* * * * *